US008506251B2

(12) United States Patent
Hada et al.

(10) Patent No.: US 8,506,251 B2
(45) Date of Patent: Aug. 13, 2013

(54) GAS TURBINE BLADE, MANUFACTURING METHOD THEREFOR, AND GAS TURBINE USING TURBINE BLADE

(75) Inventors: Satoshi Hada, Tokyo (JP); Takahiko Imada, Tokyo (JP); Tomofumi Shintani, Tokyo (JP); Katsutoshi Ooe, Tokyo (JP); Norifumi Hirata, Tokyo (JP); Hiroshi Asano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 198 days.

(21) Appl. No.: 13/093,437

(22) Filed: Apr. 25, 2011

(65) Prior Publication Data

US 2011/0217181 A1 Sep. 8, 2011

Related U.S. Application Data

(63) Continuation-in-part of application No. 12/960,970, filed on Dec. 6, 2010.

(30) Foreign Application Priority Data

Mar. 3, 2010 (JP) .................................. 2010-046687

(51) Int. Cl.
*F01D 5/18* (2006.01)
(52) U.S. Cl.
USPC ........................................................... 416/92
(58) Field of Classification Search
USPC ............................. 416/193 A, 92, 96 R, 97 R
See application file for complete search history.

(56) References Cited

U.S. PATENT DOCUMENTS

| | | | | | |
|---|---|---|---|---|---|
| 2,972,807 | A | * | 2/1961 | Turner et al. | 29/889.721 |
| 6,644,921 | B2 | * | 11/2003 | Bunker et al. | 416/97 R |
| 6,910,864 | B2 | * | 6/2005 | Tomberg | 416/90 R |
| 6,957,948 | B2 | * | 10/2005 | Brooks et al. | 416/96 R |
| 2009/0297361 | A1 | * | 12/2009 | Dahmer et al. | 416/97 |

FOREIGN PATENT DOCUMENTS

| | | |
|---|---|---|
| EP | 0 207 799 A2 | 1/1987 |
| JP | 62-10402 A | 1/1987 |
| JP | 03-151501 A | 6/1991 |
| JP | 03-182602 A | 8/1991 |

(Continued)

OTHER PUBLICATIONS

International Search Report of PCT/JP2010/071506, mailing date Feb. 22, 2011.

(Continued)

*Primary Examiner* — Richard Edgar
(74) *Attorney, Agent, or Firm* — Westerman, Hattori, Daniels & Adrian, LLP

(57) ABSTRACT

Gas turbine blades which simplify the formation of cooling channels provided inside the turbine blades while simultaneously avoiding loss of turbine blade strength and rigidity due to forming of the cooling channels. Cooling channels provided in the interior of a gas turbine blade include a plurality of straight channel-like base-side elongated holes extending in a longitudinal direction at a base side of the turbine blade, a plurality of straight channel-like tip-side elongated holes extending in a longitudinal direction at a tip side of the turbine blade, and a plurality of communicating hollow portions interposed at connection portions between the two types of elongated holes to allow the two types of elongated holes to communicate with each other, and have larger cross-sectional areas than the channel cross-sectional areas of both elongated holes. The communicating hollow portions are formed to match the position of a platform portion of the turbine blade.

4 Claims, 9 Drawing Sheets

(56) References Cited

FOREIGN PATENT DOCUMENTS

| JP | 2007-211618 A | | 8/2007 |
|---|---|---|---|
| JP | 2007211618 A | * | 8/2007 |
| JP | 2008-038774 A | | 2/2008 |
| JP | 2009-167934 A | | 7/2009 |

OTHER PUBLICATIONS

Notice of Allowance dated Jan. 15, 2013, issued in corresponding Japanese Patent Application No. 2012-503100.
Notice of Allowance dated Dec. 20, 2012, issued in corresponding Korean Patent Application No. 10-2012-7017810, with English translation (4 pages).

* cited by examiner

TIP-SIDE ELONGATED HOLE FORMING STEP

COMPLETION OF COOLING CHANNEL

GAS TURBINE BLADE, MANUFACTURING METHOD THEREFOR, AND GAS TURBINE USING TURBINE BLADE

CROSS-REFERENCE TO RELATED APPLICATIONS

This application is a continuation of U.S. application Ser. No. 12/960,970, filed Dec. 6, 2010, which is hereby incorporated by reference herein in its entirety.

This application is based on Japanese Patent Application No. 2010-046687, which is hereby incorporated by reference herein in its entirety.

TECHNICAL FIELD

The present invention relates to gas turbine blades used in thermal power generation and so forth and relates, more specifically, to gas turbine blades in which cooling channels formed inside the turbine blades are improved, to a manufacturing method therefor, and to a gas turbine using the turbine blades.

BACKGROUND ART

In a gas turbine, because high-temperature working fluid flows in the area surrounding turbine blades, in general, cooling channels are formed inside the turbine blades in the longitudinal direction of the turbine blades, and cooling of the turbine blades is performed by streaming cooling air through the cooling channels. Part of the air compressed by a turbine compressor is extracted and fed into the cooling channels as the cooling air, and this cooling air flows through the cooling channels to cool the turbine blades from inside, thereby protecting the turbine blades from the heat of the high-temperature working fluid (combustion gas). Known conventional gas turbines (gas turbine blades) employing such a configuration include technology disclosed in Patent Literature 1.

In the conventional gas turbine disclosed in Patent Literature 1, a single-space hollow portion is formed from a base side of a turbine blade toward a tip side thereof, whereas a plurality of straight-channel-like elongated holes are formed from the tip side of the turbine blade toward the base side thereof; and these elongated holes communicate with the hollow portion at a mid portion of the turbine blade in the longitudinal direction. In addition, the hollow portion is widened at the portion communicating with the elongated holes. Accordingly, when forming the elongated holes from the tip side of the turbine blade by machining, the elongated holes are readily made to communicate with the hollow portion, and machining thereof is easy.

CITATION LIST

Patent Literature

{PTL 1} Japanese Unexamined Patent Application, Publication No. 2007-211618.

SUMMARY OF INVENTION

Technical Problem

However, with the structure in Patent Literature 1, because the hollow portion is formed as a single space, the effective cross-sectional area of the turbine blade ends up being reduced at this portion, thus causing a loss of turbine blade strength and rigidity; in the worst case, breakage (creep rupture, etc.) may be caused, and there has been a lack of reliability. On the other hand, if no hollow portion is provided but a plurality of straight-channel-like forms are formed by applying elongated-hole machining from both sides of the tip side and the base side of the turbine blade and connecting the channel-like forms at a mid portion so as to form one elongated hole, the effective cross-sectional area of the turbine blade can be increased for the space made by providing no hollow portion. However, in this method, it is difficult to align centers of the channel-like forms at the time of elongated-hole machining from two opposite directions, which may increase the machining costs or decrease the production yield due to incomplete penetration of the elongated holes with each other.

The present invention has been conceived in light of the above-described circumstances, and an object thereof is to provide gas turbine blades that are capable of simplifying the formation of cooling channels provided inside the turbine blades while simultaneously being capable of avoiding a loss of turbine blade strength and rigidity due to the formation of the cooling channels, thus being highly reliable, as well as to provide a manufacturing method therefor and a gas turbine employing the turbine blades.

Solution to Problem

In order to solve the above-described problems, the present invention employs the following solutions.

Specifically, gas turbine blades according to a first aspect of the present invention are gas turbine blades in which cooling channels are formed inside the turbine blades, and the turbine blades are cooled by causing cooling air to circulate through the cooling channels, wherein the cooling channels include a plurality of straight channel-like base-side elongated holes that extend in a longitudinal direction at a base side of the turbine blade, a plurality of straight channel-like tip-side elongated holes that extend in a longitudinal direction at a tip side of the turbine blade, and a plurality of communicating hollow portions that are interposed at connection portions between the base-side elongated holes and the tip-side elongated holes to individually allow the two types of elongated holes to communicate with each other and that have larger cross-sectional areas than the channel cross-sectional areas of the two types of elongated holes.

According to the present invention, for example, when forming the tip-side elongated holes from the tip side of the turbine blades after forming the base-side elongated holes and the communicating hollow portions, because cross-sectional areas of the communicating hollow portions are larger than channel cross-sectional areas of the base-side elongated holes and the tip-side elongated holes, the tip-side elongated holes can easily penetrate the communicating hollow portions. Accordingly, it is possible to simplify the formation of the cooling channels formed inside the turbine blades. In addition, because the base-side elongated holes are formed in the plurality of straight-channel-like forms instead of a single hollow portion, it is possible to avoid the loss of turbine blade strength and rigidity caused by the formation of the cooling channels.

In addition, in gas turbine blades according to a second aspect of the present invention, the communicating hollow portions are formed so as to match the position of the platform portion of the turbine blade. Accordingly, the communicating hollow portions having the largest lateral cross-sectional areas among the cooling channels are formed inside the platform portions where the plate thickness is the largest in the turbine blades; therefore, portions where the effective cross-sectional areas of the turbine blades become small in practice are minimized, and thus, it is possible to prevent the loss of turbine blade strength and rigidity.

Furthermore, in gas turbine blades according to a third aspect of the present invention, among the plurality of the communicating hollow portions, the communicating hollow portions that are adjacent to each other are set at different heights. Accordingly, the communicating hollow portions adjacent to each other are prevented from being arranged at the same height, thereby increasing the distance between the individual communicating hollow portions; therefore, the effective cross-sectional areas of the turbine blades are prevented from being reduced at the positions of the communicating hollow portions, thereby making it possible to prevent the loss of turbine blade strength and rigidity.

Furthermore, in gas turbine blades of the present invention, at least lengths from tip ends of the plurality of the tip-side elongated holes to the communicating hollow portions are set to be the same. Accordingly, simultaneous machining with a plurality of electrodes or drills is possible, variance in the accuracy of machining of the elongated holes does not occur, and the accuracy of machining is much improved.

Additionally, a gas turbine according to a fourth aspect of the present invention employs the gas turbine blades of any one of the first to third aspects described above. Accordingly, turbine blade strength and rigidity are ensured, and thus, reliability is enhanced.

Finally, a manufacturing method of gas turbine blades according to a fifth aspect of the present invention, in the case of forming the cooling channels in the gas turbine blade of any one of the first to third aspects described above, includes a base-side elongated hole forming step of forming the base-side elongated holes from a base side of the turbine blade by electromachining, a communicating hollow portion forming step of forming the communicating hollow portions by decreasing or halting the machining speed of the electromachining at terminal end positions of the base-side elongated holes, and a tip-side elongated hole forming step of forming the tip-side elongated holes from tip side of the turbine blade to make the tip-side elongated holes penetrate into the communicating hollow portions.

With this manufacturing method, by lowering the machining speed of or halting the electromachining at the terminal end positions of the base-side elongated holes, it is possible to easily form the communicating hollow portions having larger cross-sectional areas than the channel cross-sectional areas of the base-side elongated holes, thus consequently making it possible to simplify the formation of the cooling channels as a whole.

Advantageous Effects of Invention

As described above, the gas turbine blades and the manufacturing method therefor according to the present invention are capable of simplifying the formation of cooling channels provided inside the turbine blades while simultaneously being capable of avoiding a loss of turbine blade strength and rigidity due to the formation of the cooling channels, thereby increasing reliability of the turbine blades and, consequently, the gas turbine as a whole.

DESCRIPTION OF EMBODIMENTS

A plurality of embodiments of gas turbine blades according to the present invention will be described below with reference to the drawings.

First Embodiment

Figure 1:
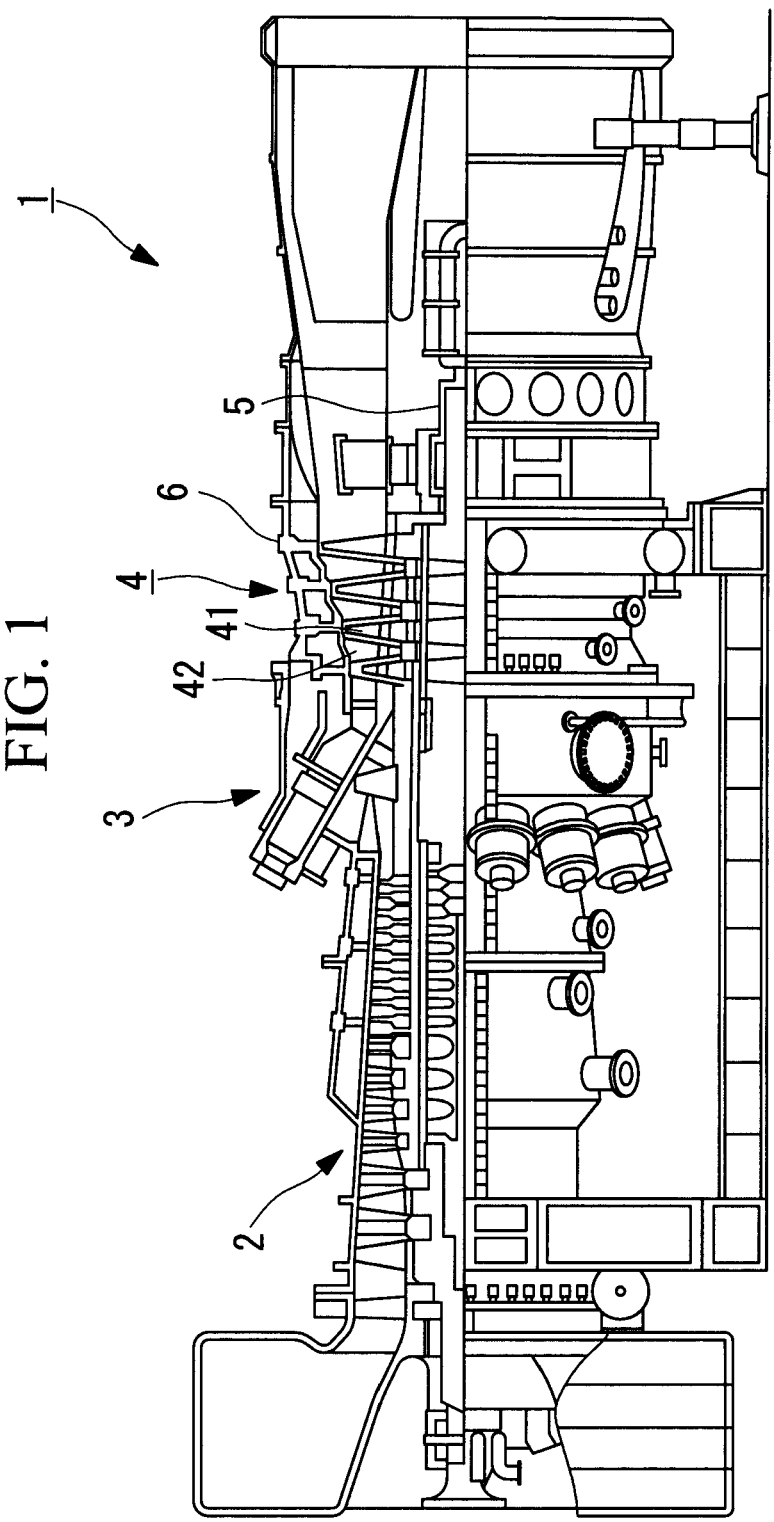
FIG. 1 is an overall configuration diagram showing an example of a gas turbine to which turbine blades according to embodiments of the present invention are applied.
Figure 2:
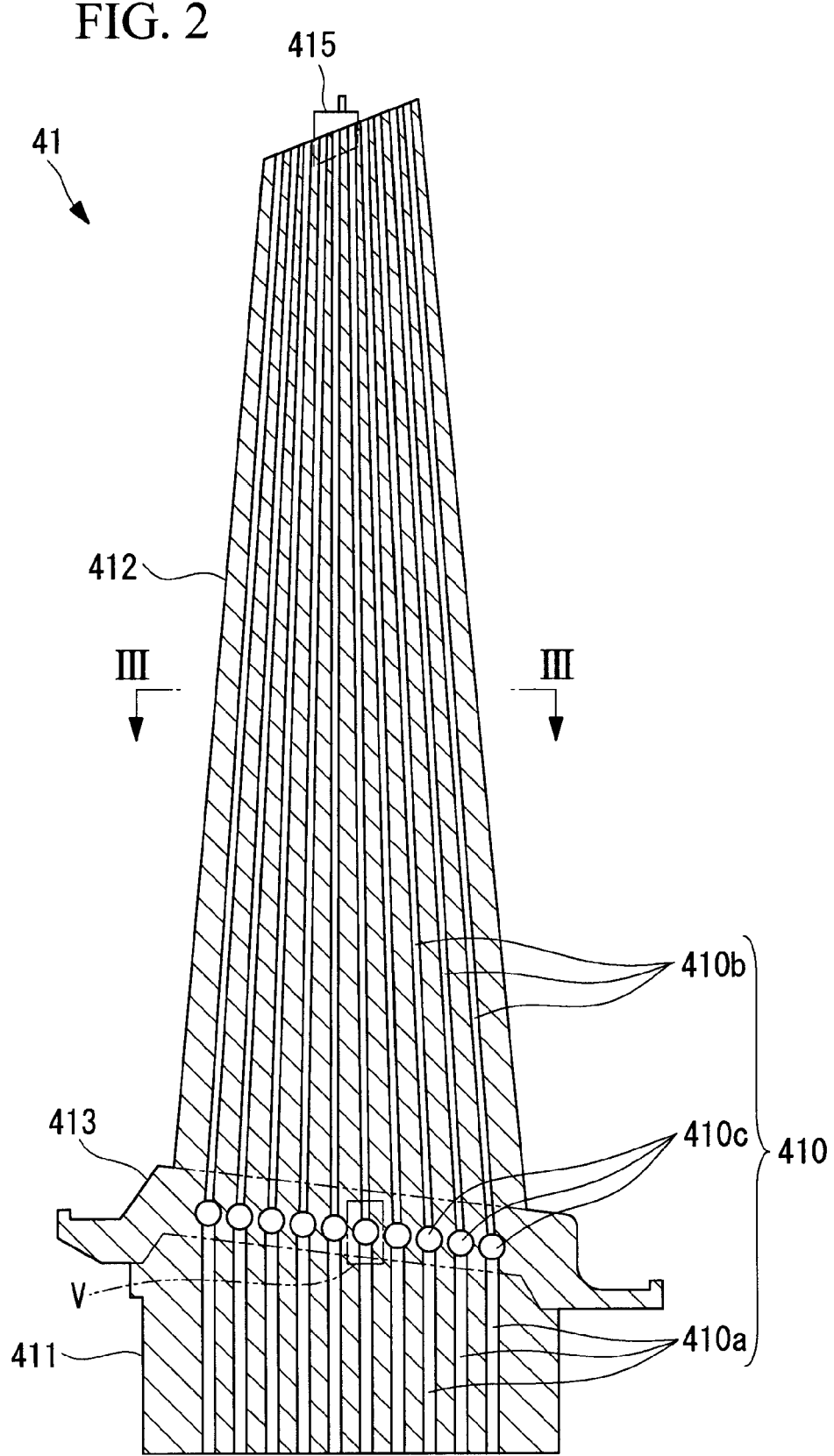
FIG. 2 is a longitudinal cross-sectional view of the turbine blades showing a first embodiment of the present invention.

FIGS. 1 to 6 show a first embodiment of the present invention. FIG. 1 is an overall configuration diagram showing an example of a gas turbine to which turbine blades according to the present invention are applied. The gas turbine 1 is provided with a compressor 2, a combustor 3, and a turbine 4. The compressor 2 compresses the air taken in from an air-intake port to generate compressed air. The combustor 3 generates high-temperature, high-pressure combustion gas by spraying fuel into the compressed air. The turbine 4 generates a driving force by converting the thermal energy of the combustion gas into the rotational energy of a rotor 5. Then, the driving fore is transmitted to a generator (not shown) or the like connected to the rotor 5. The turbine 4 is disposed inside a turbine housing 6 which is provided so as to connect with the combustor 3.

The turbine 4 includes several stages of turbine blades 41 that are disposed in the rotor 5 so as to integrally rotate therewith, and several stages of turbine vanes 42 that are disposed alternately between the individual turbine blades 41 while being secured onto an inner circumferential surface of the turbine housing 6. Then, the high-temperature, high-pressure combustion gas generated at the combustor 3 passes through between these turbine blades 41 and turbine vanes 42 while expanding, thereby rotating the rotor 5 together with the turbine blades 41 to generate the driving force. In this turbine 4, part of the compressed air is extracted from the compressor 2 as cooling air, and members exposed to high-temperature gas, such as the turbine blades 41, the turbine vanes 42, and so forth, are, as described below, cooled from inside by the cooling air.

In the turbine blades 41, base portions 411, blade portions 412, and platform portions 413 are integrally formed with durable steel material having heat resistant and corrosion resistant; the base portions 411 are fitted to the rotor 5, the blade portions 412 extend in radial directions from the rotor 5, and tip portions of the individual blade portions 412 are circumferentially connected by a ring-shaped shroud 415. The platform portions 413 form a continuous cylindrical shape when individual turbine blades 41 are attached to the rotor 5, and thus, the flow of the combustion gas is rectified.

A plurality of multi-hole cooling channels 410 are formed inside the turbine blades 41, and the compressed air extracted from the compressor 2 is supplied to these cooling channels 410 as the cooling air via flow paths (not shown) provided inside the rotor 5. The cooling air is supplied from bottom portions of the base portions of the turbine blades 41, cools the inside of the turbine blades 41 in the process of flowing in the cooling channels 410 toward the tip portions thereof, and thus, the blade portions 412 are protected from the heat due to the high-temperature combustion gas.

The cooling channels 410 are configured having a plurality of straight channel-like base-side elongated holes 410a that are formed so as to extend in the longitudinal direction at the base side of the turbine blades 41, a plurality of tip-side elongated holes 410b that are similarly formed in straight-channel-like forms so as to extend in the longitudinal direction at the tip side of the turbine blades 41, and a plurality of communicating hollow portions 410c that are interposed at connecting portions between the base-side elongated holes 410a and the tip-side elongated holes 410b to individually allow the two types of elongated holes 410a and 410b to communicate with each other.

Figure 3:
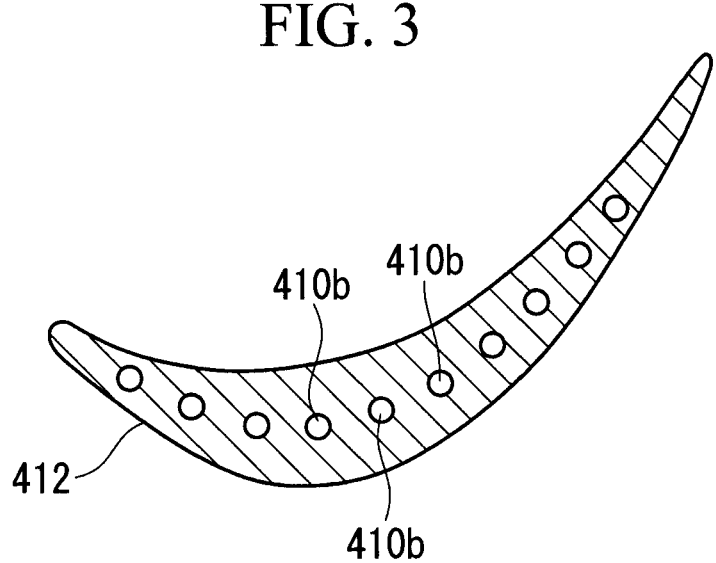
FIG. 3 is a lateral cross-sectional view of the turbine blades taken along the line III-III in FIG. 2.
Figure 4:
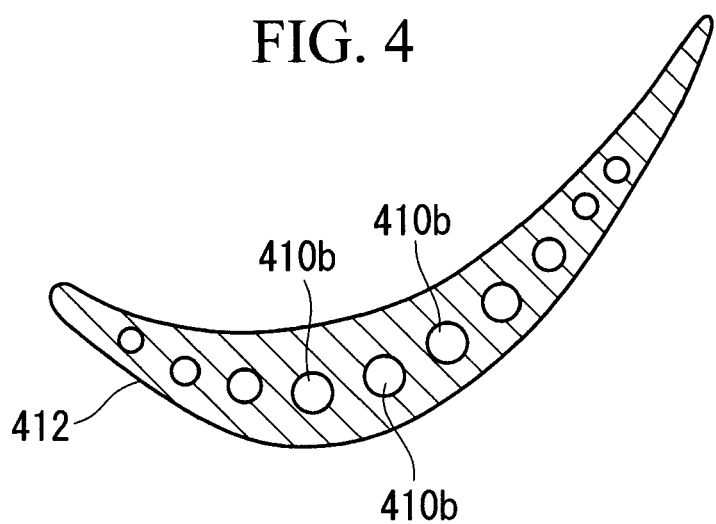
FIG. 4 is a lateral cross-sectional view of the blade portions showing an example in which inner diameters of tip-side elongated holes are altered in accordance with the plate thickness of the blade portions.

As shown in FIG. 3, the tip-side elongated holes 410b are disposed at nearly equal intervals along curved shapes of the blade portions 412. As shown in FIG. 4, inner diameters of the tip-side elongated holes 410b may be altered in accordance with the plate thickness of the blade portions 412. Here, the inner diameters of the tip-side elongated holes 410b that pass through portions where the plate thickness of the blade portions 412 is large are made larger than the inner diameters of the tip-side elongated holes 410b that pass through portions where the plate thickness is small.

Figure 5:
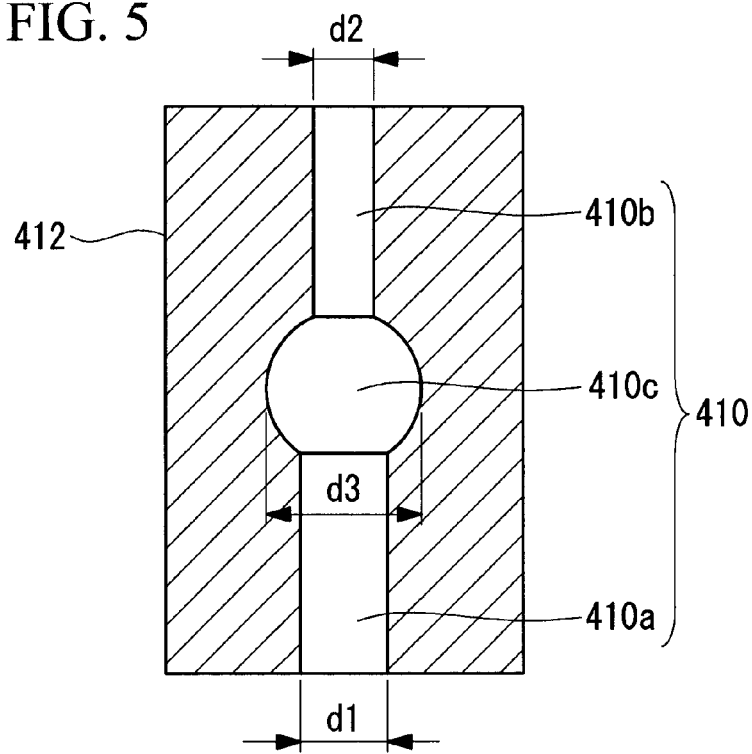
FIG. 5 is a longitudinal cross-sectional view showing the vicinity of communicating hollow portions of cooling channels, where the portion V in FIG. 2 is enlarged.
Figure 6:
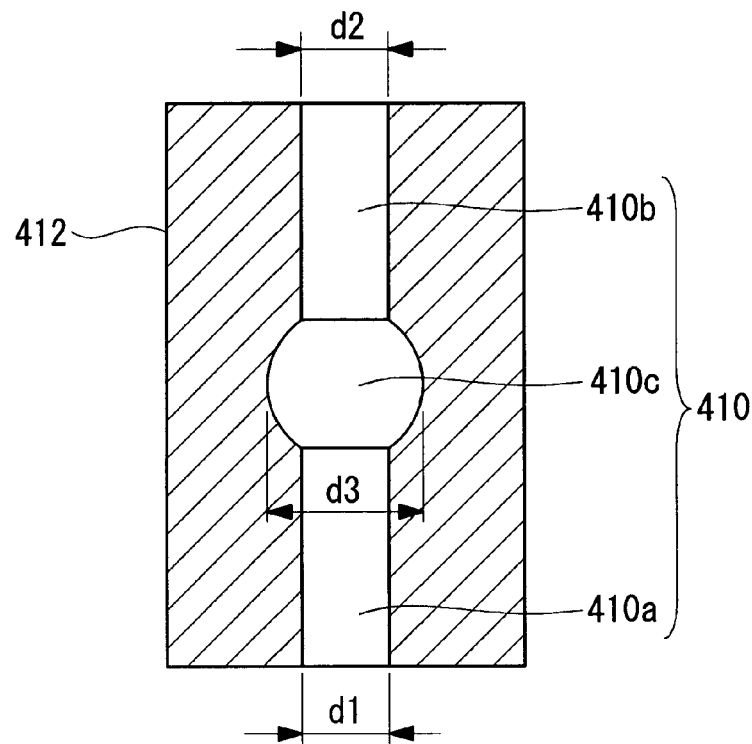
FIG. 6 is a longitudinal cross-sectional view of the vicinity of communicating hollow portions of cooling channels, showing an example in which inner diameters of base-side elongated holes and the tip-side elongated holes are made identical.

As shown in an enlarged view in FIG. 5, the channel cross-sectional areas (inner diameters d1) of the base-side elongated holes 410a are larger than the channel cross-sectional areas (inner diameters d2) of the tip-side elongated holes 410b. Note that, as shown in FIG. 6, the inner diameters d1 of the base-side elongated holes 410a and the inner diameters d2 of the tip-side elongated holes 410b may be of the same size. As shown in FIG. 4, when altering the inner diameters of the tip-side elongated holes 410b in accordance with the plate thickness of the blade portions 412, the inner diameters of the base-side elongated holes 410a may be similarly altered.

The communicating hollow portions 410c are formed in spherical shapes, spheroid shapes, or the like, having larger lateral cross-sectional areas than the channel cross-sectional areas of the base-side elongated holes 410a and the tip-side elongated holes 410b. The communicating hollow portions 410c are formed so as to match the positions (height) of the platform portions 413 whose plate thickness is larger than the base portions 411 and the blade portions 412.

Next, a method of forming the cooling channels 410 in the turbine blades 41 configured as above will be described with reference to FIGS. 7A to 7D.

Figure 7A:
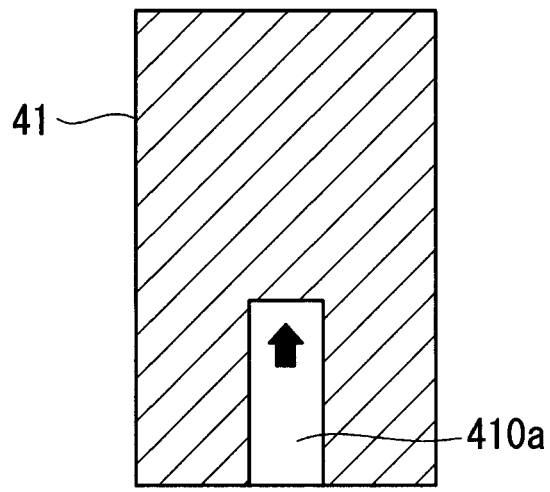
FIG. 7A is a longitudinal cross-sectional view showing a base-side elongated hole forming step in a manufacturing procedure of the turbine blades.

First, in a base-side elongated hole forming step shown in FIG. 7A, the base-side elongated holes 410a are formed from the base side of the turbine blades 41, that is, the base portions 411 side thereof, by electromachining, for example, electrical discharge machining, electrochemical machining (preferably nitric-acid electrochemical machining), or the like.

Figure 7B:
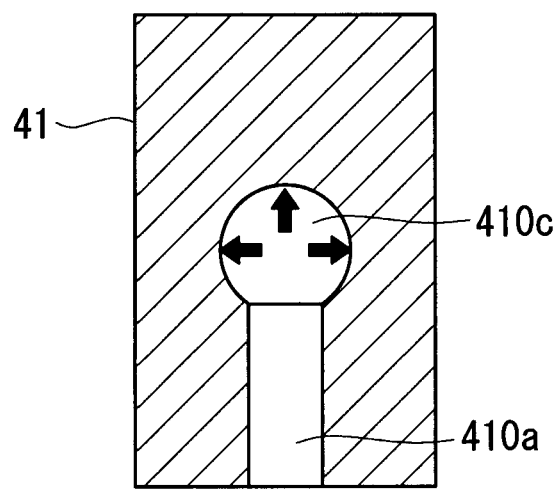
FIG. 7B is a longitudinal cross-sectional view showing a communicating hollow portion forming step in the manufacturing procedure of the turbine blades.

Next, in a communicating hollow portion forming step shown in FIG. 7B, the machining speed of the electromachining is lowered or halted to be temporarily maintained at terminal end positions of the base-side elongated holes 410a, that is, the vicinity of the height where the platform portions 413 are formed. Accordingly, the inner diameters of the base-side elongated holes 410a at the terminal end portions are expanded, thereby forming spherically shaped or spheroid shaped communicating hollow portions 410c inside the platform portions 413. Here, machining of the turbine blades 41 from the base side thereof is completed. Note that, the terminal end positions of the base-side elongated holes 410a are not limited to the platform portions 413 and may be provided at the base portions 411.

Figure 7C:
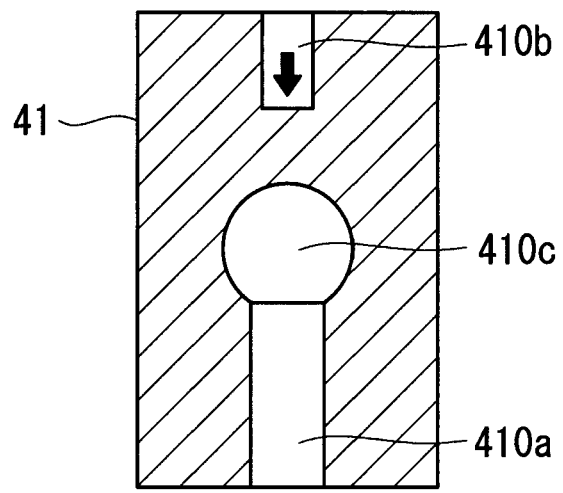
FIG. 7C is a longitudinal cross-sectional view showing a tip-side elongated hole forming step in the manufacturing procedure of the turbine blades.

Next, in a tip-side elongated hole forming step shown in FIG. 7C, the tip-side elongated holes 410b are formed from the tip side of the turbine blades 41 by electromachining, for example, the electrical discharge machining or the electrochemical machining, or by milling with a drill or the like, and the machining is completed by having the tip-side elongated holes 410b penetrate into the communicating hollow portions 410c.

Figure 7D:
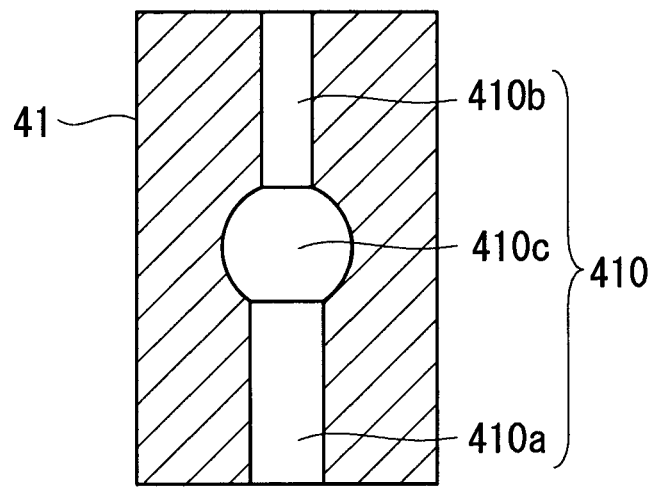
FIG. 7D is a longitudinal cross-sectional view showing a state in which cooling channels are completed in the manufacturing procedure of the turbine blades.

As shown in FIG. 7D, the base-side elongated holes 410a, the tip-side elongated holes 410b, and the communicating hollow portions 410c are made to communicate with each other in this way, thus completing the cooling channels 410.

In this way, by employing the machining method in which the machining speed of the electromachining is lowered or halted at the terminal end positions of the base-side elongated holes 410a, the communicating hollow portions 410c having larger cross-sectional areas than the channel cross-sectional areas of the base-side elongated holes 410a can easily be formed, the ease of penetration by the tip-side elongated holes 410b that lead thereto is enhanced, thus consequently making it possible to simplify formation of the cooling channels 410 as a whole.

In the turbine blades 41 configured as above, the cooling channels 410 are configured having the plurality of the base-side elongated holes 410a that extend in the longitudinal direction at the base side of the turbine blades 41, the plurality of the tip-side elongated holes 410b that extend in the longitudinal direction at the tip side of the turbine blades 41, and the communicating hollow portions 410c that are positioned at the connecting portions of the individual elongated holes 410a and 410b; and the cross-sectional areas (inner diameters d3) of the communicating hollow portions 410c are larger than the channel cross-sectional areas (inner diameters d1 and d2) of the individual elongated holes 410a and 410b; therefore, even if the positions of the tip-side elongated holes 410b are slightly shifted in the tip-side elongated hole forming step shown in FIG. 7C, the level of penetration into the communicating hollow portions 410c is much improved, thus making it possible to simplify formation of the cooling channels 410.

In addition, because the base-side elongated holes 410a are formed in the plurality of straight-channel-like forms instead of a single hollow portion, sufficient effective cross-sectional areas are ensured at these portions of the turbine blades 41, and there is no loss of strength and rigidity of the turbine blades 41. Moreover, because the communicating hollow portions 410c where the lateral cross-sectional areas is the largest in the cooling channels 410 are formed inside the platform portions 413 where the plate thickness is the largest in the turbine blades 41, the portions where the effective cross-sectional areas of the turbine blades 41 become small in practice are minimized, thereby making it possible to reliably reduce the reduction in strength and rigidity of the turbine blades 41.

Note that, although machining is started from the base side toward the tip side in the elongated hole forming steps show in FIGS. 7A to 7C, in contrast, machining may be started from the tip side toward the base side.

Finally, by applying the turbine blades 41 whose strength and rigidity are ensured in this way to the turbine 4, it is possible to considerably enhance the reliability of the gas turbine 1.

Second Embodiment

Figure 8:
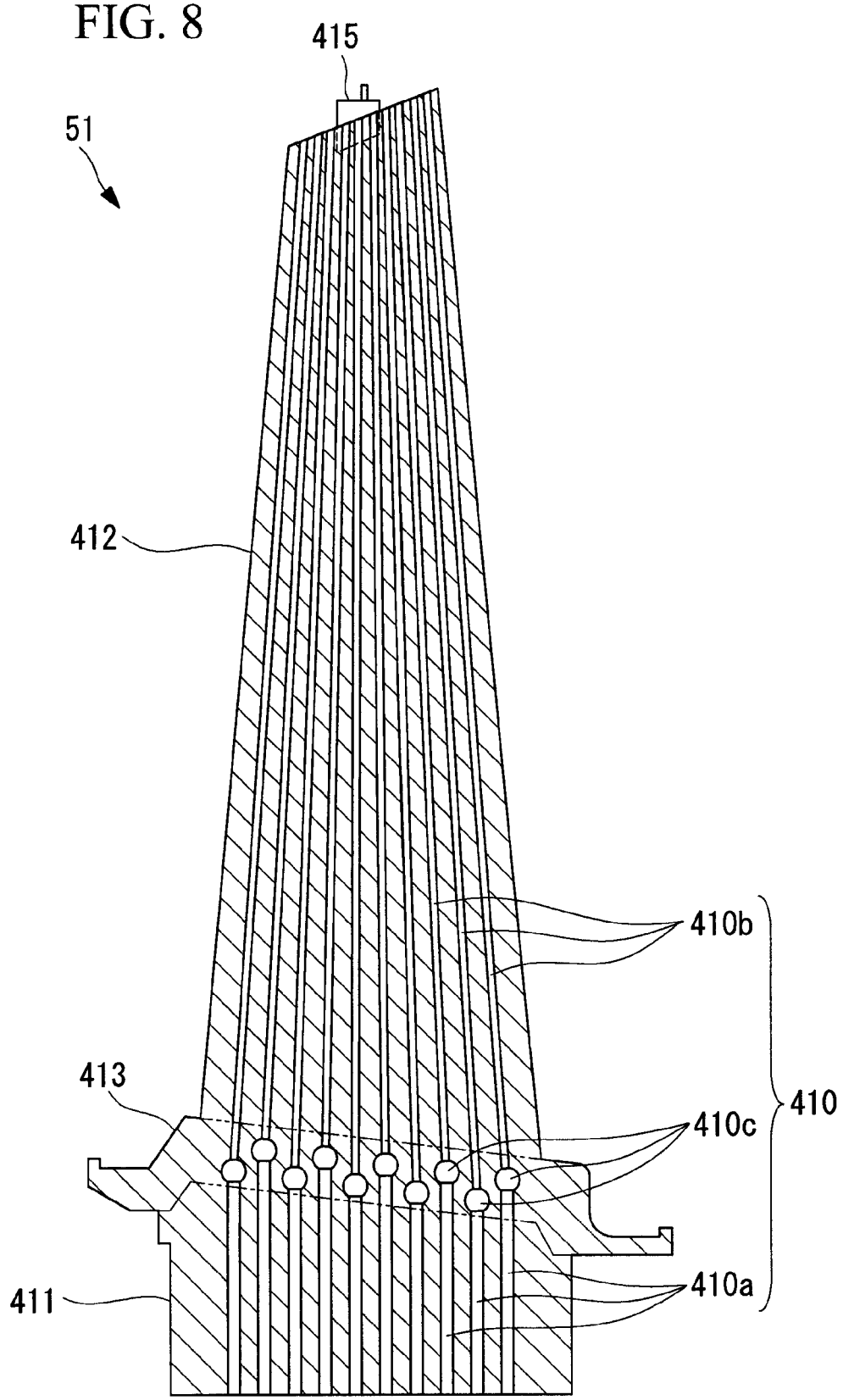
FIG. 8 is a longitudinal cross-sectional view of the turbine blades showing a second embodiment of the present invention.

Next, a second embodiment of the present invention will be described with reference to FIG. 8. Except for the point that the positions in the longitudinal direction differ for the plurality of the communicating hollow portions 410c that constitute the cooling channels 410, turbine blades 51 illustrated in this second embodiment are similar to the turbine blades 41 of the first embodiment shown in FIG. 2.

Here, the communicating hollow portions 410c are disposed, for example, in a staggered manner by varying the heights thereof in the vertical direction, so that the heights of the communicating hollow portions 410c that are adjacent to each other among the plurality of the communicating hollow portions 410c differ. Even if the heights are altered in this way, it is desirable that all of the communicating hollow portions 410c be formed so as to be positioned inside the platform portions 413.

With this configuration, the communicating hollow portions 410c that are adjacent to each other are not arranged at the same height, and distances between the individual communicating hollow portions 410c are increased; therefore, a reduction of the effective cross-sectional areas of the turbine blades 51 at the positions of the communicating hollow portions 410c is avoided, thereby more effectively preventing the loss of strength and rigidity of the turbine blades 51.

Third Embodiment

Figure 9:
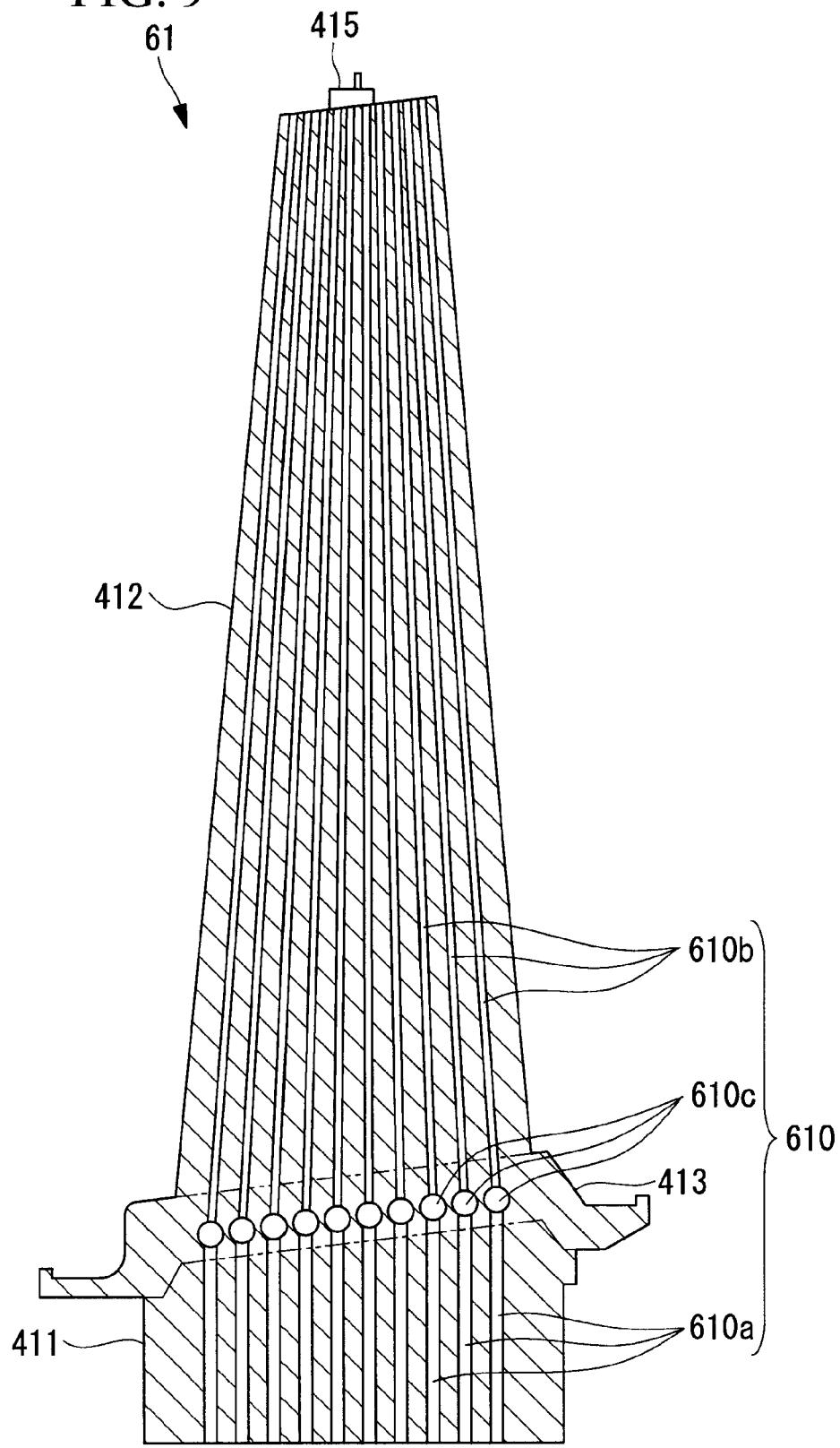
FIG. 9 is a longitudinal cross-sectional view of the turbine blades showing a third embodiment of the present invention.

Next, a third embodiment of the present invention will be described with reference to FIG. 9. Except for the point that lengths from tip ends of a plurality of tip-side elongated holes 610b to the communicating hollow portions are set to be the same, turbine blades 61 illustrated in this third embodiment are similar to the turbine blades 41 of the first embodiment shown in FIG. 2.

By setting the lengths of the plurality of the tip-side elongated holes 610b to be the same, simultaneous machining with a plurality of electrodes or drills is possible, variance in the accuracy of machining of the elongated holes does not occur, and the accuracy of machining is much improved.

Fourth Embodiment

Figure 10:
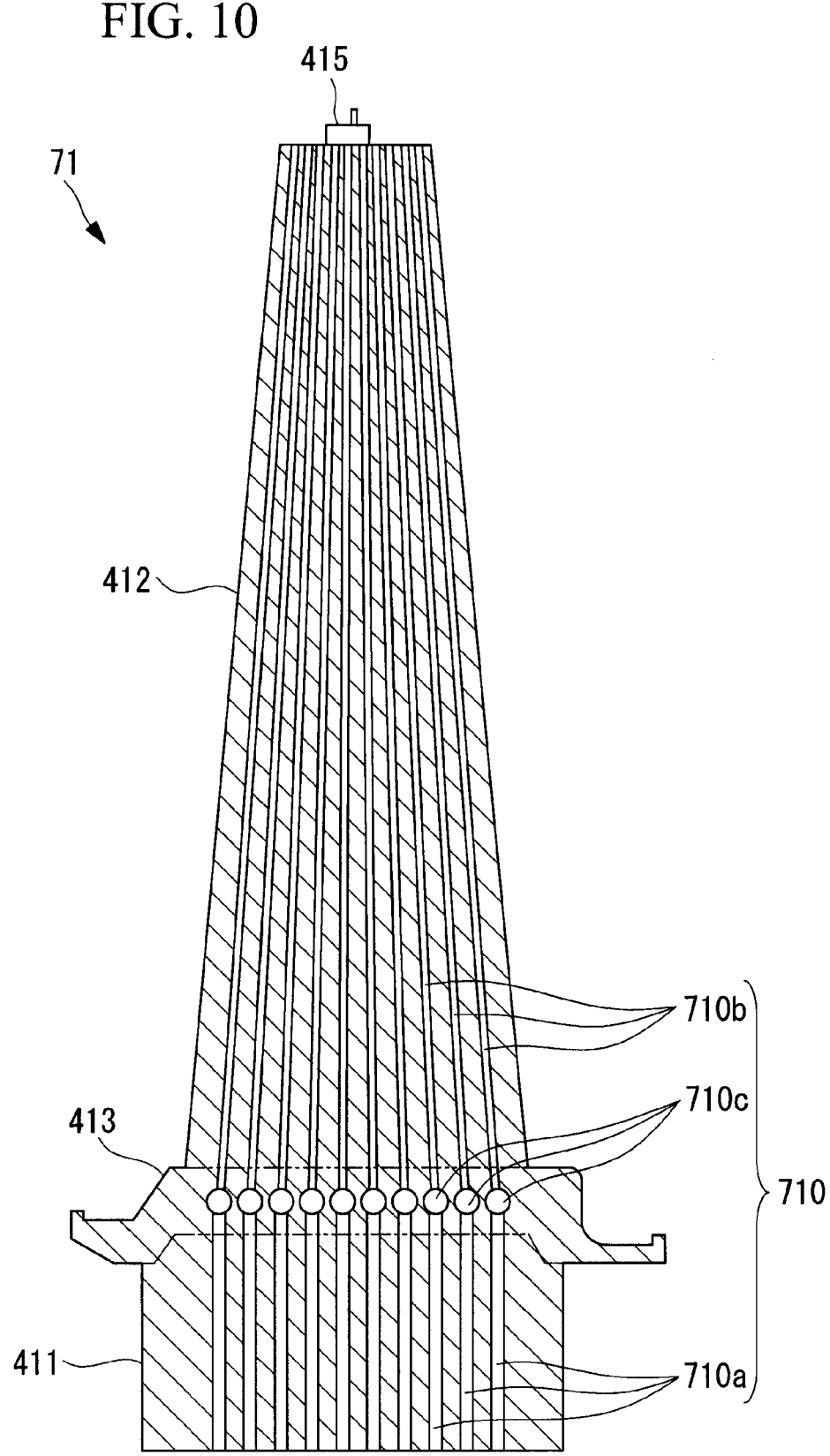
FIG. 10 is a longitudinal cross-sectional view of the turbine blades showing a fourth embodiment of the present invention.

Next, a fourth embodiment of the present invention will be described with reference to FIG. 10. Except for the point that lengths from tip ends of a plurality of tip-side elongated holes 710b to the communicating hollow portions are set to be the same, and furthermore lengths from end faces of base portions 411 of a plurality of base-side elongated holes 710a to the communicating hollow portions are also set to be the same, turbine blades 71 illustrated in this fourth embodiment are similar to the turbine blades 41 of the first embodiment shown in FIG. 2.

By setting the lengths of the tip-side elongated holes 710b and the lengths of the base-side elongated holes 710a respectively to be the same, similar effects to those of the turbine blade 61 in the third embodiment can be obtained.

REFERENCE SIGNS LIST 1 gas turbine
2 compressor
3 combustor
4 turbine
5 rotor
6 turbine housing
41 turbine blade
51 turbine blade
61 turbine blade
71 turbine blade
410 cooling channel
410a base-side elongated hole
410b tip-side elongated hole
410c communicating hollow portion
411 base portion
412 blade portion
413 platform portion
415 shroud

The invention claimed is:

1. A gas turbine blade in which cooling channels are formed inside the turbine blade, and the turbine blade is cooled by causing cooling air to circulate through the cooling channels, wherein
   the cooling channels comprise:
   a plurality of straight channel-like base-side elongated holes that extend in a longitudinal direction at a base side of the turbine blade,
   a plurality of straight channel-like tip-side elongated holes that extend in a longitudinal direction at a tip side of the turbine blade, and
   a plurality of communicating hollow portions that are interposed at connection portions between the base-side elongated holes and the tip-side elongated holes to individually allow the two types of elongated holes to communicate with each other, and that have larger cross-sectional areas than the channel cross-sectional areas of the two types of elongated holes,
   wherein the communicating hollow portions are formed so as to match the position of a platform portion of the turbine blade, and
   wherein, among the plurality of the communicating hollow portions, the communicating hollow portions that are adjacent to each other are set at different heights.

2. A gas turbine blade according to claim 1, wherein at least lengths from tip ends of the plurality of the tip-side elongated holes to the communicating hollow portions are set to be the same.

3. A gas turbine employing the gas turbine blade according to claim 1 in a turbine.

4. A manufacturing method of a gas turbine blade, in the case of forming the cooling channels in the gas turbine blade according to claim 1, comprising:

a base-side elongated hole forming step of forming the base-side elongated holes from a base side of the turbine blade by electromachining, a communicating hollow portion forming step of forming the communicating hollow portions by decreasing or halting the machining speed of the electromachining at terminal end positions of the base-side elongated holes, and a tip-side elongated hole forming step of forming the tip-side elongated holes from tip side of the turbine blade to make the tip-side elongated holes penetrate into the communicating hollow portions.

* * * * *